United States Patent [19]

Och

[11] Patent Number: 4,594,762

[45] Date of Patent: Jun. 17, 1986

[54] PICKUP HEAD FOR MEASURING AND ASSEMBLING PROCEDURES

[75] Inventor: Rudolf Och, Nuremberg, Fed. Rep. of Germany

[73] Assignee: Frenco Verzahnungslehren GmbH, Nuremberg, Fed. Rep. of Germany

[21] Appl. No.: 703,350

[22] Filed: Feb. 20, 1985

[30] Foreign Application Priority Data

Mar. 1, 1984 [DE] Fed. Rep. of Germany ....... 3407551

[51] Int. Cl.⁴ .............................................. B23Q 1/00
[52] U.S. Cl. .................................................. 29/281.4
[58] Field of Search .................. 29/281.4, 271; 901/45

[56] References Cited

U.S. PATENT DOCUMENTS 3,824,674  7/1974  Inoyama et al. .
3,893,217  7/1975  Edmond .

FOREIGN PATENT DOCUMENTS 2504127  9/1975  Fed. Rep. of Germany .
2556595  1/1976  Fed. Rep. of Germany .
2640256  3/1977  Fed. Rep. of Germany .
 234815  2/1945  Switzerland .

Primary Examiner—Robert C. Watson
Attorney, Agent, or Firm—Scully, Scott, Murphy & Presser

[57] ABSTRACT

A pickup head for measuring and assembling procedures. A central member which is axially blocked on the object, is pivotable about an axial angle through the intermediary of a cam drive constituted of at least one arbor or ball on a housing and an inclined groove on the body, at an axial lift of the hosing against the force of springs, and including a switch which, upon a predetermined axial lift of the central member, will effect a feed and return movement.

9 Claims, 11 Drawing Figures

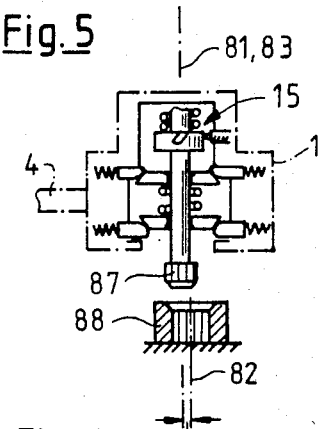
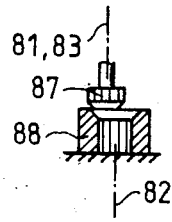
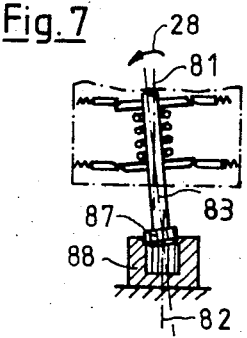
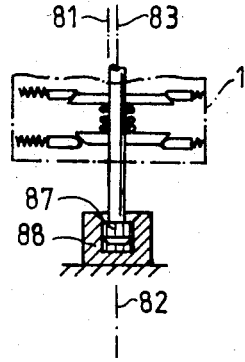
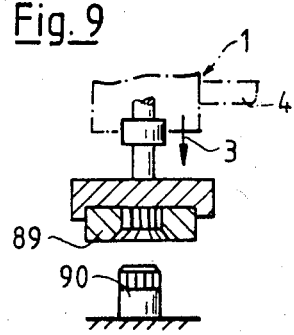
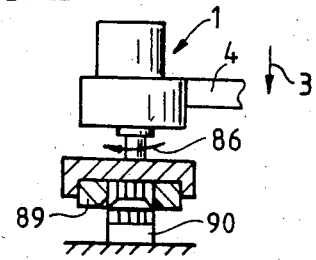
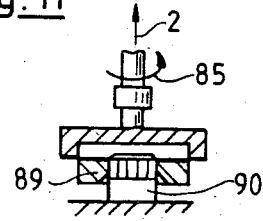

PICKUP HEAD FOR MEASURING AND ASSEMBLING PROCEDURES

BACKGROUND OF THE INVENTION

1. Field of the Invention

The present invention relates to a pickup head for measuring and assembling procedures.

Measuring procedures are carried out on workpieces being processed intermediate the work stations of a production line. On the other hand, the processed workpieces are to be completed with additional components during the assembling phase. The measuring and the assembling procedures are effected in an automatic manner. Hereby, there are encountered the following problems: axial offset of the workpiece relative to the central measuring or, respectively, assembling axis; at a narrow tolerance or fitted clearance between a toothed or splined hub and toothed or splined shaft; an extremely difficult insertion into each other, during the testing of the profiles with gauges as well as with measuring heads.

2. Discussion of the Prior Art

From the disclosure of German Laid-Open Patent Application No. 25 56 59 there has become known a holding arrangement with the resilient support of the holding mechanism for montage or assembling purposes. The holding mechanism is coupled with a driving shaft through the intermediary of two springs which are independent of each other. One spring is effective in the axial direction, and the other is effective in a non-axial direction.

With this arrangement, a piston is to be inserted into a cylinder notwithstanding any offsetting of the axes or any relative tilting between the piston and cylinder.

Disadvantageous during the assembling and measuring processes of toothed or splined components is the sensitivity to vibrations of the arrangement in the peripheral direction because of the springs. A precise positional correlation between the tooth and the gap or opening is extremely time-consuming. Moreover, the problem has not been solved as to the manner in which there is attained the position of tooth on tooth, and the position of tooth on gap, in order to at all be able to carry out the assembling and measuring process.

SUMMARY OF THE INVENTION

Accordingly, it is an object of the present invention to provide a novel automatic pickup head for precision gearing. The pickup head should facilitate the rapid introduceability of the toothed or splined shafts into toothed or splined hub profiles, and conversely also of gauging profiles.

The foregoing object is achieved pursuant to the teaching of the present invention in that a central member which is axially blocked on the object, is pivotable about an axial angle through the intermediary of a cam drive constituted of at least one arbor or ball on a housing and an inclined groove on the body, at an axial lift of the housing against the force of springs, and including a switch which, upon a predetermined axial lift of the central member, will effect a feed and return movement.

The pickup head can be equipped through known per se connecting media with measuring apparatuses or components which are to be mounted thereon. The pickup head is mounted on a vertical or horizontal feed unit and carries the component which is to be inserted towards the matching counterpart.

In accordance with the foregoing, there is thus present a simple and precisely conducted and universally applicable pickup head for measuring and assembling possesses which are to be carried out rapidly.

There is also afforded the secure montage or assembly of form-locking interengaging components, such as toothed or splined stub shaft couplings, as well as testing procedures on internal and outer toothing by means of gearing measuring gauges. The problem of the blocked work process which is caused by the components abutting against each other at their head ends is solved in a simple manner in that the pickup head will rotate the axially blocked central member for so long, until there has been reached the form-locking alignment. Subsequently, there is effected the axial feed of the central member. After the completion of the work process there is automatically effected the starting positioning or resetting of the angle of rotation angle. If, notwithstanding the foregoing, the insertion sequence cannot be or only incompletely carried out, tnen the axially-acting pressure spring together with the switch will guarantee the undamaged condition of the toothed or splined components. Any mechanical overloading is precluded inasmuch as the return movement is initiated in a timely manner.

Pursuant to another features of the invention, there is provided a dual, self-aligning or pendulum bearing which is free of play, and because of irs floating support can be utilized for a horizontal, vertical, as well as angled installation, such as in gripper arms. Any offset of the axes of the pickup head relative to the workpiece, as well as an angular offset between the axis of tne pickup head and the transverse axis of the workpiece, is corrected through the supports of the central member, such that in every instance there can be implemented the measuring and assembling process.

The pickup head is also adapted as a transmitting apparatus for the mounting of toothed or splined hubs on toothed or splined shafts. In addition thereto, the pickup head can be connected to a gripper arm. An exemplary instance of an application relative thereto comprises gear wheels with internal gear teeth or external gear teeth, which are attached onto corresponding matching counterpart profiles.

In accordance with another inventive feature, there can be determined a measuring point in a simple manner during the installation of a measuring medium such as a mandrel or ring.

Pursuant to a further feature. there is ensured that the central member which has been rurned to some extent out of its initial angular position after traveling out from the object, will return to its initial position by means of the pressure springs.

According to another feature of the invention, there is afforded the axial position and the drawing out or, in essence, drawing off of a measuring medium which is clamped in the object during the return stroke of the pickup head.

Pursuant to another aspect of the invention there is achieved that for a clamping fit of the measuring medium which is present in the object during tne range of measurement, in which the balls of the cam drive are pressed out of their grooves, after the drawing out, or drawing off, of the measuring medium there is fixed the starting position of the central member, so that the balls again enter their grooves.

A particularly smooth rotation of the central member is achieved in the case of its axial, rubbing contact blocking; wherein, due to the relative rotation of the ring of the cam drive, pressure springs are stressed.

As soon as the restraining force of the central member caused by friction are overcome by the pressure springs, the latter press the central member to such extent in the direction of rotation until there has been reached the form-locked connection of the components which correspond with each other, such as the measuring means and the gearing or teeth of an object.

However, when a measuring medium which is fastened to the central member clamps prematurely in or on the object, than the cam drive will rotate the ring at the axially further traveling housing relatively opposite the central member, until the supply switch will effect the return stroke of the pickup head and the drawing out of the clamped measuring means over the projection on the housing and the ring axially contacting therewith. Hereby, the balls of the cam drive remain in engagement with the grooves. The starting position of the ring relative to the central member is effected by the pressure springs. In the event that the central member is also rotated relative ro the pickup head, then the starting position is guaranteed by the axial pressure spring which acts as a torsion spring.

It is essential to the invention that the central member can be used in numerous applications through its four degrees of freedom; namely, the first being axial; the second, displaceable in parallel relative to the main axis of the measuring head; the third, being pivotable about a point of rotation located between the pendulum bearings; and the fourth, being rotatable about the axis of the central member. Positional errors, such as angular and/or parallel offset of workpieces, are compensated for by the self-adjusting central member, without destroying the gearing or the toothed or splined gauge-holding profile at a blocked inserting process.

The inventive subject matter can, as a result, precenter diameters; from tooth to tooth can find the position of tooth to gap; be able to recognize non-introduceability; balance axial angular errors; any wander from the center; and monitor prescribed introducing pressures.

All of these properties constitute a prerequisite for the automatic introduction of a measuring head into a workpiece toothing or splining.

BRIEF DESCRIPTION OF THE DRAWINGS

Reference may now be had to tne following detailed description of an exemplary embodiment thereof, taken in conjunction with the accompanying drawings; in which:

FIGS. 5 through 8 illustrate different positions during an assembling process of longitudinally splined workpieces, shown in a schematic presentiation; and FIGS. 9 through 11 illustrate a further assembling process of toothed workpieces in a simplified representation.

DETAILED DESCRIPTION

Figure 1:
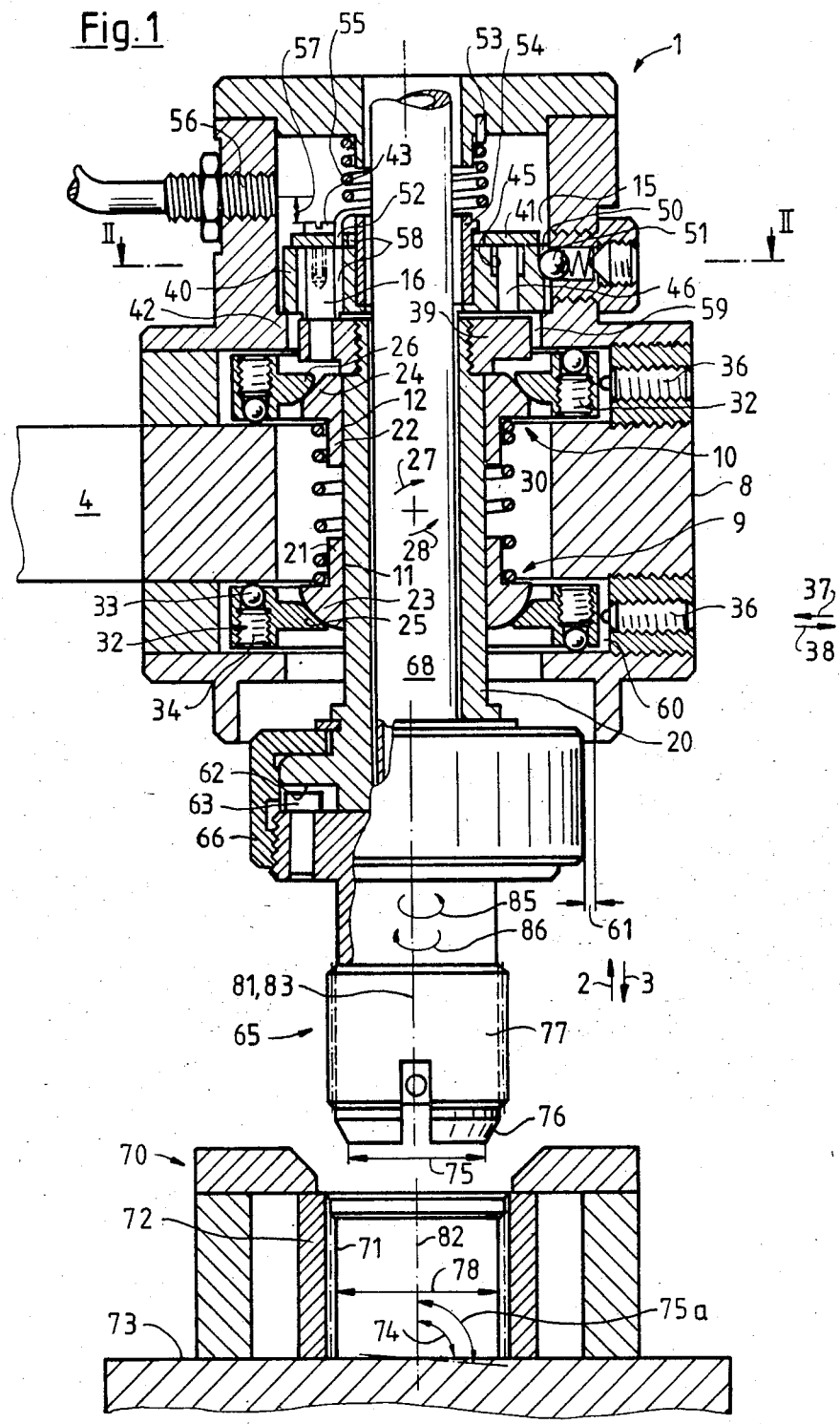
FIG. 1 illustrates a longitudinal sectional view through a pickup head with a splined measuring gauge and a workpiece arranged in a holder.

Pursuant to FIG. 1, a pickup head 1 is fastened on a pneumatic arm 4 of a feed unit, which is movable in the directions of arrows 2, 3.

The pickup head 1 includes a multi-part housing 8, the details of which are not illustrated herein inasmuch as they have no specific relevance to the invention.

Arranged in the housing 2 two pivot bearing 9, 10 with axial guides 11, 12, a cam drive 15 (FIG. 3), and a central member 20.

The central member 20 is displaceable within the axial guides 11, 12 of guide sleeves 21. 22 in conformance with the directions of arrows 2, 3. The guide sleeves 21, 22 include cone-like headpieces 23, 24. These headpieces are pivotably supported in corresponding bearing rings 25, 26 pursuant to the directions of arrows 27, 28.

A pressure spring 30 eliminates the bearing clearance of the pivot bearings 9, 10.

The bearing rings 25, 26 are floatingly and without play arranged in the housing by means of the axial thrust bearing 32. The axial thrust bearing 32 hereby consists of, respectively, a ball 33 and an adjusting pin 34.

Spring bolts 36 restrict the radial floating movement pursuant to the directions of arrows 37, 38.

The cam drive 15 consists of a ring 40, which is relatively movably connected through a threaded ring 39 with the central member 20 through pins 16, and can be pivoted relative in accordance with an angle 19. A projection 42 on the housing serves as a neutral contact during the drawing out of a hereinbelow described measuring mandrel 77 from a toothed or gear wheel 72. A cover 41 is fixedly connected with the pins 16 by means of screws 43.

Figure 2:
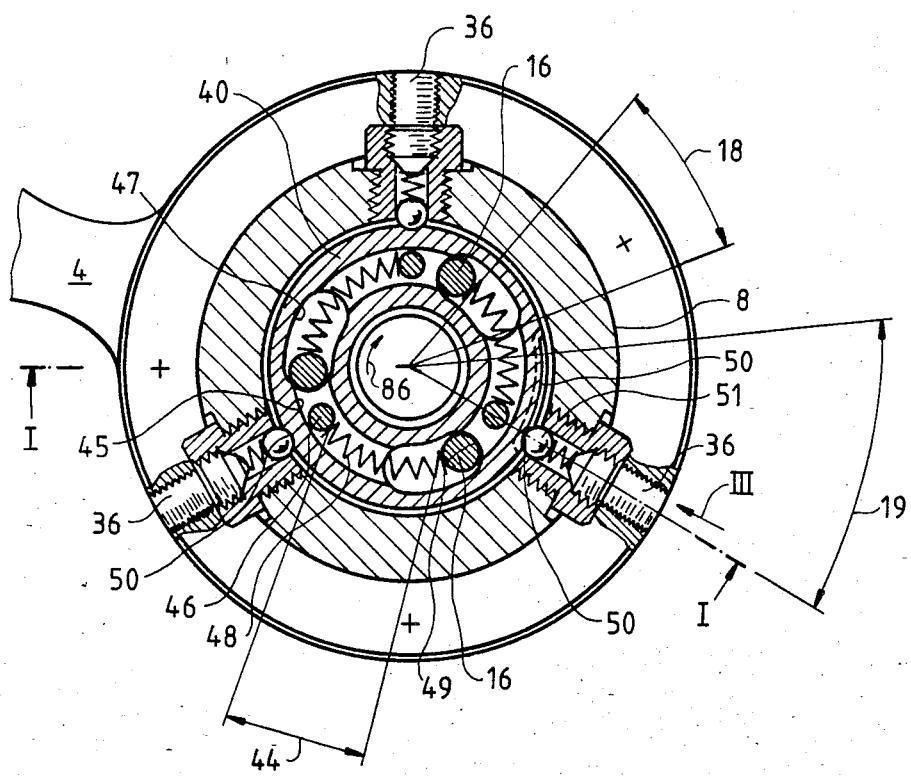
FIG. 2 illustrates a sectional view taken along line II—II in FIG. 1.

As illustrated in FIG. 2, arranged within the ring 40 is an annular passageway 45 with pins 46 positioned therein, cutouts 47 for the pins 16, and pressure springs 48 which connect the pins 16, 46 with each other.

Figure 3:
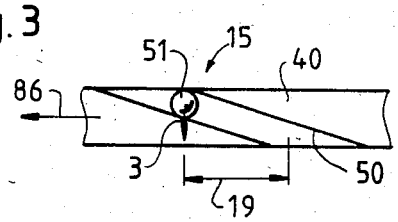
FIGS. 3 and 4 illustrate two modifications of a detail in the direction of arrow III in FIG. 2.

According to FIGS. 1 through 3, the ring 40 includes grooves 50 for spring-supported balls 51 located on the housing.

Pursuant to FIG. 1, a bushing 54 is seated in the ring 40. Clamped between the bushing 54 and the housing 8 is a pressure spring 55 which is loadable in torsion, for providing the illustrated initial or starting position of the ring 40. The ends 52, 53 of the spring are fastened to, respectively, the housing 8 and the cover 41.

A supply switch 56 which is arranged on the housing will after a feed stroke 57 of central member 20, effect the return movement of the pickup head 1 in the direction of arrow 2.

The possible extent of radial deviation of the central member 20 in the direction of arrows 37, 38 is limited by the approximately equally large annular gap 58–61.

On the side facing towards the measuring medium, the central member 20 incorporates a cutout 62 for a positioning cam 63 of a toothing or spline measuring gauge 65 constructed in accordance with German OS No. 31 09 334. The toothing measuring gauge 65 is screwed rogether with the central member 20 by means of a coupling nut 66.

A tube 68 is arranged within rhe central member 20, and is fixedly connected with the gearing measuring gauge 65.

A clamping arrangement 70 fixedly locates a gear 72 having an internal toothing or splines 71 on a measuring medium plate 73. The measuring process is effected analogous with the phases of movement illustrated in FIGS. 4 through 10.

The pickup head 1 is pneumatically moved in the direction of arrow 3 through the intermediary of the arm 4.

A precentering caliper 75 centers incline 76 of measuring mandrel 77 of the toothing gauge 65 through an inlet incline 76 within the head circle diameter 78 of the internal toothing 71.

At an offset 80 (FIG. 5) of the main or primary axis 81 of the pickup head 1 relative to the main or primary axis 82 of the workpiece 72 or 88, this is initially effected the self-adjustment of the central member 20 through the floating supports of the bearing rings 24, 25 by means of the spring bolt 36 contacting therewith along the circumference thereof.

At a further downward movement of the pickup head 1 in the direction of arrow 3, the pivot bearings 9, 10, in accordance with FIG. 6 and in the direction of arrow 28, enable a swinging of the central member 20 until there is reached the offset 80 through the parallel position of the main axis 81 and the axis 83 of the central member 20.

When the teeth or splines of the measuring mandrel 77 do not hit the tooth gaps of the internal toothing 71 the example of FIGS. 8 and 9, then the measuring mandrel 77 will travel upwardly, and is pressed upwardly in the axial guides 11, 12 of the pickup head 1 in the direction of arrow 2, inasmuch as the pickup at 1 will travel further against the force of the spring 55 in the direction of arrow 3. As a result thereof, the cam drive 15 will effect the forcible rotation of the measuring mandrel in the direction of arrow 86 (FIG. 9) opposite the force of the springs 48 and 55.

After a corresponding rotating angle (a fraction of the angle 19) the toothing or splines of the measuring mandrel 77 engage into the toothing 71. The still stressed spring 55 then presses the measuring mandre 77 in the direction of arrow 3.

In the event that the measuring mandrel 77, notwithstanding the maximum possible rorational angle 19, still does not engage into the toothing 71, the central member 20 is pressed within the pickup head 1 so far in the direction of arrow 2, until the supply switch 56 will actuate a contact and the pickup head 1 will register as not being introduceable and will be returned. The springs 40 and 55 will then set the central member, or respectively measuring mandrel 77, back into the initial or starting position.

When the measuring mandrel 77 is aligned within the internal toothing 71, it will then be moved further into the latter.

When the internal toothing 71 is not at a 90° angle 74 relative to the pickup head 1, then, during the introduction, there must radially follow the pivot or pendulum support (pivot bearings 9, 10) will deflect, as well as the floating bearing (bearing rings 25, 26 and spring bolts 36).

In the event that the internal toothing 71 is conically incident into itself, it is possible that the measuring mandrel 77 will clamp or stick in a predetermined lower axial position. The measuring mandrel 77 or, respectively, the central member 20 withn the pickup head 1, will then be pressed upwardly in the direction of arrow 2, as well as the balls 51 will disengage from the grooves 50 and the supply switch 56 will release the contact for effecting the return travel of the pickup head 1. In every instance, in the event that the central member 20 is swung out of its initial angular position, will the spring 55 finally provide for the return pivoting into the initial angular position and, as a result, for the dropping of the balls 51 into the grooves. This will assuredly prevent any damage to the measuring mandrel 77 and the gear or toothed wheel 72. It is also essential that the measuring mandrel 77 is safely drawn out of the toothed wheel 72. Serving this purpose is the projection 42 against which the ring 40 will during the return stroke.

When the introduction of the measuring mandrel 77 into the workpiece 72 follows in an orderly manner, then in the lowermost end position, the measured values are further transmitted, and the pickup head 1 travels back after a delay in time in the direction of arrow 2.

At the moment in which the toothing or splines of the measuring mandrel 77 moves out of tne internal toothing 71 of the workpiece 72, the springs 48, 55 will set the central member 20 back into its initial or starting angular position, having reference to FIG. 10, direction of arrow 85.

Pursuant to FIGS. 5 through 8, elongately toothed workpieces 87, 88 are introduced into each other.

Pursuant to FIGS. 9 through 11, an internally toothed workpiece 89 is mounted on an externally toothed workpiece 90.

As is illustrated in FIG. 3, the grooves 50 are arranged upwardly towards the left in the ring 40, such that the central member 20, due to the closing shape of the pins 16 at the end surfaces 49 of the cutouts 47 (FIG. 2), is forcibly rotatable in the direction of arrow 86 through the angle 19.

Figure 4:
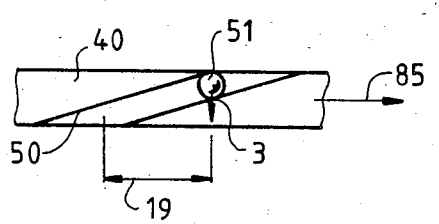

However, when the grooves 50 are oriented upwardly towards the right, as illustrated in FIG. 4, there is eliminated the forcible guidance and, instead thereof, there is obtained a relatively soft or smooth and shockless drive of the central member 20 in the direction of arrow 85. The balls 51 press the ring 40 in the direcrion of arrow 85. However, the central member 20 remains in a stationary position due to the rubbing relationships with the measuring medium and object. Consequently, the spacing 44 is continually reduced, and thereby the pressure springs 48 are stressed until the force of the pressure springs 48 overcomes the mentioned rubbing conditions. The ring 40 can, in accordance therewith traverse a maximum path of travel opposite the control member in conformance with the angle 18.

What is claimed is:

1. In a pickup head for measuring and assembling processes; including a housing; a drive element; and a central member arranged in the axis of said element and resiliently supported there against; the improvement comprising: cam drive means for pivoting said central member during an axial lift of said housing when said member is axially blocked by an object against the force of springs through an axial angle, said cam drive means including at least one arbor or ball and an inclined groove on said central member and a switch for effecting a feed end return movement at a predetermined axial stroke of the central member.

2. A pickup head as claimed in claim 1, comprising pivot bearings and axial thrust bearings for axially and pivotably displacing said central member which is self-centering on the object from an initial position against the force of said springs and pivotably or in parallel displaceably supporting said member sideways against each said pivot bearing consisting of two spaced guide sleeves supported on the central member through on interposed further spring, said sleeves each having cone-like headpieces, and including two bearing rings corresponding with said headpieces being arranged within the housing.

3. A pickup head as claimed is claim 1, wherein the bearing rings are floatingly supported on said housing through friction bearings or ball bearings.

4. A pickup head is claimed in claim 2, wherein the bearing rings are located at a radial distance from the housing, and said bearing rings are floatingly supported in a radial direction by spring bolts inserted in said housing.

5. A pickup head as claimed in claim 1, wherein said central member includes a cutout towards the measuring medium for a positioning cam facing the measuring medium for determining a definite initial position of a measuring medium.

6. A pickup head as claimed in claim 5, wherein the inclined grooves are provided on a ring which is coaxial relative to the central member, and wherein the ring opposite the central member or the central member opposite the ring, have pins into the cutouts of the ring rowards the member, said pins being pivotable relative to pressure springs arranged in the ring.

7. A pickup head as claimed in claim 1, including a pressure spring being clamped between the housing and the central member, said spring biasing the central member in the axial direction against a projection on the housing.

8. A pickup head as claimed in claim 6, wherein the pressure spring comprises a torsion spring having opposite ends fastened to the housing and to the central member, the pressure spring determining rhe axial initial position of the central member on the projection, and the initial angular position through the intermediary of the balls and the grooves.

9. A pickup head as claimed in claim 1, wherein the ring is rotatable against the stationary pins of the central member through the grooves in tne ring extending from the left below towards the right above, at an axially blocked central member through the balls opposite the force of the pressure springs at further stressing of the pressure springs, whereas the pins slide in the arcuate cutouts in the ring to the end surfaces of the cutouts.

* * * * *